US010684515B2

(12) United States Patent
Nakamura et al.

(10) Patent No.: US 10,684,515 B2
(45) Date of Patent: Jun. 16, 2020

(54) LIGHT-MODULATING CELL

(71) Applicant: DAI NIPPON PRINTING CO., LTD., Tokyo (JP)

(72) Inventors: Yusuke Nakamura, Tokyo (JP); Tomoya Kawashima, Tokyo (JP); Kumiko Kambara, Tokyo (JP); Norio Ishii, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/765,072

(22) PCT Filed: Sep. 29, 2016

(86) PCT No.: PCT/JP2016/078895
§ 371 (c)(1),
(2) Date: Mar. 30, 2018

(87) PCT Pub. No.: WO2017/057619
PCT Pub. Date: Apr. 6, 2017

(65) Prior Publication Data
US 2018/0284514 A1 Oct. 4, 2018

(30) Foreign Application Priority Data

Sep. 30, 2015 (JP) ................................ 2015-193538
Mar. 10, 2016 (JP) ................................ 2016-046985
Jul. 25, 2016 (JP) ................................ 2016-145616

(51) Int. Cl.
*G02F 1/1339* (2006.01)
*E06B 3/67* (2006.01)
(Continued)

(52) U.S. Cl.
CPC ...... *G02F 1/13394* (2013.01); *E06B 3/66304* (2013.01); *E06B 3/6722* (2013.01);
(Continued)

(58) Field of Classification Search
CPC .......... G02F 1/13394; G02F 1/133528; G02F 1/134309; G02F 1/1339; G02F 1/13;
(Continued)

(56) References Cited

U.S. PATENT DOCUMENTS 7,714,975 B1    5/2010  Yamazaki et al.
2006/0098290 A1 5/2006  Fernando et al.
(Continued)

FOREIGN PATENT DOCUMENTS

JP    H03-047392 A    2/1991
JP    H06-160823 A    6/1994
(Continued)

OTHER PUBLICATIONS

Apr. 3, 2018 International Preliminary Report on Patentability issued in Patent Application No. PCT/JP2016/078895.
(Continued)

*Primary Examiner* — Charles S Chang
(74) *Attorney, Agent, or Firm* — Oliff PLC

(57) ABSTRACT

A light-modulating cell includes: a pair of polarizing plates (a first polarizing plate and a second polarizing plate); a pair of electrodes (a first transparent electrode and a second transparent electrode) arranged between the pair of polarizing plates (the first polarizing plate and the second polarizing plate); and a pair of alignment films (a first alignment film and a second alignment film) arranged between the pair of electrodes (the first transparent electrode and the second transparent electrode). A plurality of spacers, which support at least any one of the pair of alignment films and are in two-dimensional contact with at least any one of the pair of alignment films, is provided. At least some of the plurality of spacers have an inconstant distance to another spacer positioned at a closest distance.

7 Claims, 9 Drawing Sheets

(51) Int. Cl.
  *G02F 1/13* (2006.01)
  *G02F 1/1337* (2006.01)
  *G02F 1/133* (2006.01)
  *G02F 1/137* (2006.01)
  *G02F 1/1335* (2006.01)
  *G02F 1/1343* (2006.01)
  *E06B 3/663* (2006.01)
  *E06B 9/24* (2006.01)

(52) U.S. Cl.
  CPC ............. *G02F 1/13* (2013.01); *G02F 1/1337* (2013.01); *G02F 1/1339* (2013.01); *G02F 1/13318* (2013.01); *G02F 1/13392* (2013.01); *G02F 1/13725* (2013.01); *G02F 1/133528* (2013.01); *G02F 1/133707* (2013.01); *G02F 1/134309* (2013.01); *E06B 2009/2417* (2013.01); *E06B 2009/2464* (2013.01); *G02F 2001/13312* (2013.01); *G02F 2001/13398* (2013.01); *G02F 2202/043* (2013.01)

(58) Field of Classification Search
  CPC ........... G02F 1/133707; G02F 1/13392; G02F 1/13318; G02F 1/1337; G02F 1/13725; G02F 2001/13312; G02F 2001/13398; G02F 2202/043; E06B 3/66304; E06B 3/6722; E06B 2009/2417; E06B 2009/2464
  USPC ................................................ 349/155–158
  See application file for complete search history.

(56) References Cited

U.S. PATENT DOCUMENTS

| | | | | |
|---|---|---|---|---|
| 2007/0146568 A1* | 6/2007 | Yamazaki | ......... | G02F 1/136204 349/43 |
| 2012/0236237 A1* | 9/2012 | Kanari | ............... | G02B 27/2214 349/110 |
| 2012/0268671 A1 | 10/2012 | Inoue et al. | | |
| 2012/0268702 A1* | 10/2012 | Imanishi | ............. | G02F 1/13394 349/124 |
| 2015/0116621 A1* | 4/2015 | Park | .................... | G02F 1/13394 349/43 |
| 2015/0338709 A1* | 11/2015 | Yoshida | ............ | G02F 1/136277 257/59 |

FOREIGN PATENT DOCUMENTS

| | | |
|---|---|---|
| JP | H08-184273 A | 7/1996 |
| JP | 2001-215517 A | 8/2001 |
| JP | 2001-264807 A | 9/2001 |
| JP | 2004-325525 A | 11/2004 |
| JP | 2007-515661 A | 6/2007 |
| JP | 2010-032848 A | 2/2010 |
| JP | 2012-163771 A | 8/2012 |
| JP | 2012-194257 A | 10/2012 |
| JP | 2012-234142 A | 11/2012 |
| JP | 2013-118503 A | 6/2013 |
| KR | 10-2001-0090500 A | 10/2001 |
| TW | 508628 B | 11/2002 |
| TW | 200520990 A | 7/2005 |
| TW | 201300841 A | 1/2013 |

OTHER PUBLICATIONS

Dec. 6, 2016 International Search Report issued in Patent Application No. PCT/JP2016/078895.
Mar. 1, 2019 Third Party Observation issued in European Patent Application No. 16851790.2.
Apr. 15, 2019 European Search Report issued in European Patent Application No. 16851790.2.
Mar. 22, 2019 Information Offer Form issued in Japanese Patent Application No. 2016-132821.
Nov. 22, 2019 Office Action issued in Japanese Patent Application No. 2016-132821.
Jul. 22, 2019 Office Action issued in Taiwanese Patent Application No. 105131736.
Jul. 9, 2019 Office Action issued in Japanese Patent Application No. 2016-145616.
Apr. 24, 2020 Office Action issued in Japanese Patent Application No. 2016-132821.
Apr. 24, 2020 Office Action issued in Japanese Patent Application No. 2016-145616.

* cited by examiner

LIGHT-MODULATING CELL

TECHNICAL FIELD

The present invention relates to a light-modulating cell that controls liquid crystal orientation to perform light modulation.

BACKGROUND ART

For example, an electronic blind or the like in which a light-modulating cell (light-modulating material) is installed in a window, a door, or the like, and the transmission of extraneous light is controlled by the light-modulating cell has been known. It is possible to suitably employ a liquid crystal, for example, as such a light-modulating cell.

The light-modulating cell employing the liquid crystal is produced by, for example, sandwiching a liquid crystal layer between a pair of transparent film members forming transparent electrodes or between a pair of alignment films so as to prepare a liquid crystal cell, and sandwiching this liquid crystal cell between linear polarizing plates to take linearly polarized light. When light-modulating is performed by using a light-modulating cell employing a liquid crystal, the transmission of light is controlled by controlling an electric field to be applied to the liquid crystal layer to change orientation of liquid crystal molecules contained in the liquid crystal layer, and the light-modulating cell can switch the shielding and transmission of extraneous light and continuously change the amount of transmitted light, for example.

For example, Patent Literature 1 discloses a liquid crystal panel that is provided in a window or a door of a house and capable of controlling a transparent state and an opaque state. According to this liquid crystal panel, a plurality of divided liquid crystal panels are juxtaposed, and each of the divided liquid crystal panels can be individually controlled between the transparent state and the opaque state.

In addition, Patent Literature 2 discloses a light control glass window capable of adjusting light transmittance in various patterns in accordance with a change of a sunlight situation. According to this light control glass window, the light transmittance can be adjusted by changing a voltage acting on a liquid crystal sealed between two transparent glass plates to change optical characteristics of the liquid crystal.

CITATION LIST

Patent Literature

Patent Literature 1: Japanese patent application publication No. 03-47392
Patent Literature 2: Japanese patent application publication No. 08-184273

SUMMARY OF INVENTION

Technical Problem

In a light-modulating cell having a liquid crystal cell, there is a case where a spacer is provided between the pair of transparent film members (alignment films) forming the liquid crystal cell, and the liquid crystal layer is held at a desired thickness by the spacer. In this case, it is possible to produce an alignment layer by, for example, preparing the spacer, and then, creating a thin film of polyimide or the like and subjecting the thin film to rubbing, and it is possible to regulate the orientation of a liquid crystal material with this alignment layer.

Such a spacer can be formed using various methods, and it is possible to accurately form a large number of spacers, regularly arranged, at once, for example, based on a photolithography technique. In general, all the spacers are regularly arranged and a distance between the spacers is adjusted to be constant in order to simply and accurately form the multiple spacers.

However, as a result of earnest research, the inventors of the present application have found that, when the regularity relating to the arrangement of the spacers is high and the distance between the spacers is constant, the intervals at which lights diffracted by the respective spacers interfere with each other and intensify each other also become regular, so that a point light source may be recognized as blurred light. That is, when the spacers are regularly arranged, the interference of the diffracted light generated by the spacers periodically occurs and the diffracted beams of light periodically intensify each other, and thus, the point light source looks larger than the original size so that the visibility of observation light that has passed through the light-modulating cell deteriorates.

Therefore, it is desired to propose a new method for reducing influence of the interference of diffracted light generated by the spacers in the light-modulating cell provided with the multiple spacers so as to provide the observation light excellent in visibility. In particular, there is a request for reduction of the influence of interference of diffracted light generated by the spacers in order to provide the observation light excellent in visibility even in a liquid crystal cell employing a guest-host liquid crystal, which has attracted attention in recent years. However, a proposal effective in satisfying such a request has not been made in the related art literatures (for example, the above-described Patent Literatures 1 and 2).

The present invention has been made in view of the above-described circumstances, and an object of the present invention is to provide a light-modulating cell that is capable of reducing influence of interference of diffracted light generated by a plurality of spacers and providing observation light excellent in visibility.

Another object of the present invention is to provide a light-modulating cell employing a guest-host liquid crystal that is capable of reducing influence of interference of diffracted light generated by a plurality of spacers and providing observation light excellent in visibility.

Solution to Problem

One aspect of the present invention is directed to a light-modulating cell comprising: a pair of polarizing plates; a pair of film substrates arranged between the pair of polarizing plates; a pair of electrodes arranged between the pair of polarizing plates; a pair of alignment films arranged between the pair of electrodes; a plurality of spacers supporting at least any one of the pair of alignment films and being in two-dimensional contact with at least any one of the pair of alignment films; and a liquid crystal layer arranged between the plurality of spacers between the pair of alignment films, wherein at least some of the plurality of spacers have an inconstant distance to another spacer positioned at a closest distance.

According to this aspect, the distance between the spacers is inconstant, and therefore it is possible to reduce the influence of interference of diffracted light generated by the plurality of spacers and to provide the observation light excellent in visibility.

Another aspect of the present invention is directed to a light-modulating cell comprising: a pair of film substrates; a pair of electrodes arranged between the pair of film substrates; a pair of alignment films arranged between the pair of electrodes; a plurality of spacers supporting at least any one of the pair of alignment films and being in two-dimensional contact with at least any one of the pair of alignment films; and a liquid crystal layer arranged between the plurality of spacers between the pair of alignment films, wherein the liquid crystal layer contains at least a dichroic pigment, and at least some of the plurality of spacers have an inconstant distance to another spacer positioned at a closest distance.

The light-modulating cell may further include a polarizing plate provided on the opposite side of the pair of electrodes with one of the pair of film substrates interposed therebetween.

Each of the plurality of spacers may have a flat first bottom portion in contact with one of the pair of alignment films and a second bottom portion opposing the first bottom portion.

According to this aspect, the alignment film can be accurately supported by each spacer. Incidentally, it is possible to suitably form the plurality of spacers according to this aspect based on, for example, a photolithography technique.

The plurality of spacers may be made of a photocurable resin.

According to this aspect, it is possible to easily form each spacer by utilizing the photocuring performance of the photocurable resin. Incidentally, it is possible to suitably form the plurality of spacers according to this aspect based on, for example, a photolithography technique.

The plurality of spacers may be configured by repeatedly arranging unit patterns each of which is formed of three or more spacers arranged with a predetermined relative positional relationship.

According to this aspect, it is possible to easily form the plurality of spacers while reducing the influence of interference of diffracted light generated by the plurality of spacers.

Each of the plurality of spacers may have a tapered shape that tapers from one of the pair of alignment films toward the other alignment film.

According to this aspect, the alignment film can be accurately supported by the respective spacers.

A taper angle of each of the plurality of spacers may be in a range of 75° or larger and 85° or smaller.

According to this aspect, an appropriate alignment regulating force can be imparted to the liquid crystal layer by the alignment film while accurately supporting the alignment film with the respective spacers.

At least any one of the pair of polarizing plates may be partially or entirely curved.

At least any one of the pair of film substrates may be partially or entirely curved.

According to these aspects, the light-modulating cell can be applied to a curved structure.

Each of the plurality of spacers may include a core portion and a covering portion covering at least a part of the core portion, penetrate through one of the pair of alignment films and the liquid crystal layer, and have a first support surface being in two-dimensional contact with the other alignment film of the pair of alignment films and a second support surface being in two-dimensional contact with one of the pair of electrodes, and the first support surface may be formed by the covering portion, and at least a part of the second support surface may be formed by the core portion.

According to this aspect, it is possible to accurately form the respective spacers based on a so-called photolithography technique.

Advantageous Effects of Invention

According to the present invention, the distance between spacers is inconstant, and therefore the periodicity in mutual interference of diffracted light generated by the respective spacers disappears. Thus, the influence of interference of diffracted light generated by the plurality of spacers is reduced, and the observation light excellent in visibility can be created.

BRIEF DESCRIPTION OF DRAWINGS

FIG. 7A illustrates a spherical spacer, and FIG. 7B illustrates a columnar (truncated conical) spacer illustrated in FIG. 2.

FIG. 9A is a cross-sectional view of the light-modulating cell, and FIG. 9B is a plan view of a first polarizing plate in which an absorption axis direction is indicated by an arrow "A".

FIG. 10A is a cross-sectional view of the light-modulating cell, and FIG. 10B is a plan view of the first polarizing plate in which the absorption axis direction is indicated by an arrow "A".

DESCRIPTION OF EMBODIMENTS

Figure 1:
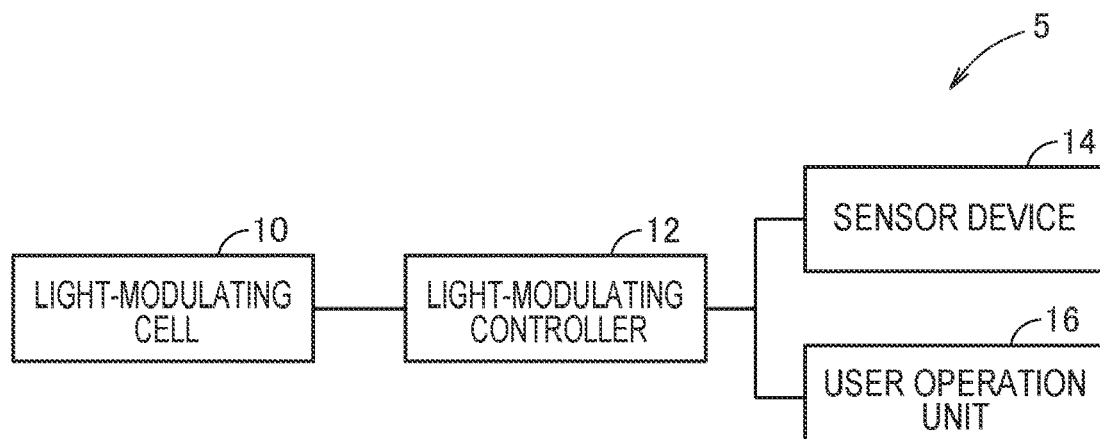
FIG. 1 is a conceptual diagram illustrating an example of a light-modulating system.

Hereinafter, an embodiment of the present invention will be described with reference to the drawings. In the drawings attached to the specification of the present application, a scale, a dimensional ratio, and the like of each element are conveniently exaggerated and changed from the actual scale, dimensional ratio, and the like in order to facilitate the illustration and understanding. In addition, in this specification, the terms "plate", "sheet", and "film" are not distinguished from each other based solely on differences in nomenclature. For example, the term "plate" is a concept that also includes a member which can be called a sheet or a film. In addition, the terms specifying shapes, geometric conditions, and extent thereof used in this specification (for example, terms such as "parallel", "orthogonal", and "same", values of a length and an angle, and the like) are understood as terms meaning ranges of extent where substantially the equivalent or similar functions can be expected without being bound by strict meaning.

FIG. 1 is a conceptual diagram illustrating an example of a light-modulating system 5.

A light-modulating cell 10 of this example has a layer made of a liquid crystal material containing liquid crystal molecules as will be described later, and can switch shielding and transmission of light and change the transmittance (transmissivity) of light. An object to which the light-modulating cell 10 is applied is not particularly limited, and typically, the light-modulating cell 10 can be applied to a window, a door, and the like. In particular, a columnar spacer to be described later is excellent in position fixing performance, and a position thereof is hardly varied by an external force such as vibration. Therefore, the light-modulating cell 10 having the columnar spacer to be described later can be suitably used even under environment where the external force such as vibration is applied, and can also be applied to a window (for example, a skylight) installed in a house.

The light-modulating cell 10 is connected to a light-modulating controller 12, and a sensor device 14 and a user operation unit 16 are connected to the light-modulating controller 12. The light-modulating controller 12 controls a light-modulating state of the light-modulating cell 10 and can switch the shielding and transmission of light using the light-modulating cell 10 and change the light transmittance in the light-modulating cell 10. Specifically, the light-modulating controller 12 can switch the shielding and transmission of light using the light-modulating cell 10 and change the light transmittance by adjusting an electric field to be applied to a liquid crystal layer of the light-modulating cell 10 to change orientation of the liquid crystal molecules in the liquid crystal layer.

The light-modulating controller 12 can adjust the electric field to be applied to the liquid crystal layer based on an arbitrary method. For example, the light-modulating controller 12 can switch the shielding and transmission of light using the light-modulating cell 10 and change the light transmittance by adjusting the electric field to be applied to the liquid crystal layer in accordance with a measurement result of the sensor device 14 or an instruction (command) input by a user via the user operation unit 16. Therefore, the light-modulating controller 12 may automatically adjust the electric field to be applied to the liquid crystal layer in accordance with the measurement result of the sensor device 14 or may manually adjust the electric field in accordance with the instruction of the user input via the user operation unit 16. Incidentally, an object to be measured by the sensor device 14 is not particularly limited, and, for example, the brightness of use environment may be measured, and in this case, the switching of the shielding and transmission of light using the light-modulating cell 10 and the change of the light transmittance are performed in accordance with the brightness of use environment. In addition, it is not always necessary for both the sensor device 14 and the user operation unit 16 to be connected to the light-modulating controller 12, and any one of the sensor device 14 and the user operation unit 16 may be connected to the light-modulating controller 12.

Figure 2:
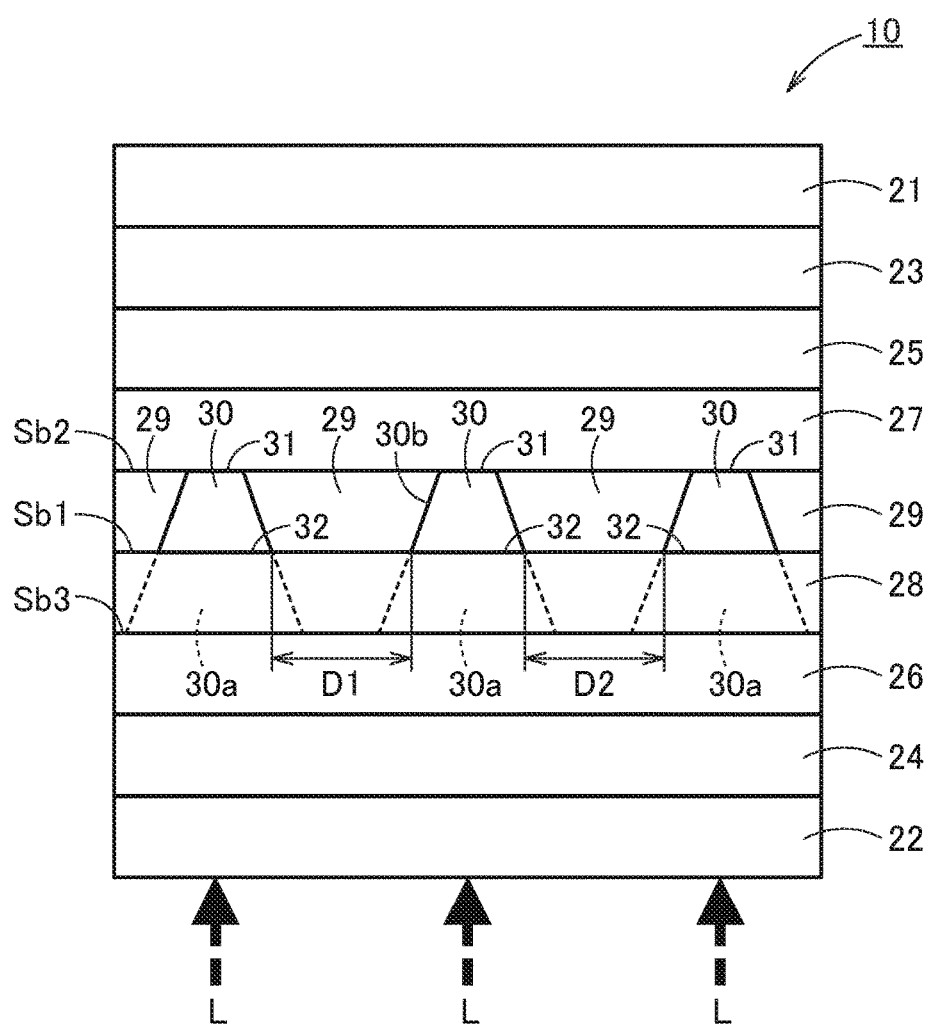
FIG. 2 is a view illustrating an example of a cross section of a light-modulating cell.

FIG. 2 is a view illustrating an example of a cross section of the light-modulating cell 10.

The light-modulating cell 10 of this example includes: a pair of polarizing plates (a first polarizing plate 21 and a second polarizing plate 22); a pair of transparent electrodes (a first transparent electrode 25 and a second transparent electrode 26) arranged between the pair of polarizing plates; and a pair of alignment films (a first alignment film 27 and a second alignment film 28) arranged between the pair of transparent electrodes. In addition, a pair of film substrates (a first film substrate 23 and a second film substrate 24) are arranged at each outer side of the pair of transparent electrodes (the first transparent electrode 25 and the second transparent electrode 26) between the pair of polarizing plates (the first polarizing plate 21 and the second polarizing plate 22) in this example. That is, the pair of transparent electrodes (the first transparent electrode 25 and the second transparent electrode 26) are arranged between the pair of film substrates (the first film substrate 23 and the second film substrate 24), and the pair of polarizing plates (the first polarizing plate 21 and the second polarizing plate 22) are arranged at each outer side of the pair of film substrates (the first film substrate 23 and the second film substrate 24).

Furthermore, a plurality of columnar spacers 30, which support at least any one of the pair of alignment films (the first alignment film 27 in this example) and are in two-dimensional contact with, that is, surface contact with at least any one of the pair of alignment films (the first alignment film 27 in this example), are provided in this example. In addition, portions among the plurality of spacers 30 are filled with liquid crystal layers 29 between the pair of alignment films (the first alignment film 27 and the second alignment film 28).

Incidentally, the plurality of spacers 30 preferably extend at least between a "boundary surface Sb2 between the first alignment film 27 and the liquid crystal layer 29" and a "boundary surface Sb1 between the second alignment film 28 and the liquid crystal layer 29". Therefore, for example, the plurality of spacers 30 may be arranged only between the first alignment film 27 and the second alignment film 28. In addition, the plurality of spacers may be provided so as to penetrate through the second alignment film 28 and the liquid crystal layer 29 from the second transparent electrode 26 (a "boundary surface Sb3 between the second transparent electrode 26 and the second alignment film 28" in the example illustrated in FIG. 2) and be in contact with the first alignment film 27 as indicated by reference sign "30a" in FIG. 2. Incidentally, it is possible to apply the present invention in the same manner in both the case where the spacer 30 is provided only between the first alignment film 27 and the second alignment film 28 and the case where the spacer indicated by reference sign 30a of FIG. 2 is provided.

Each of the first polarizing plate 21 and the second polarizing plate 22 has a unique polarization axis and a unique absorption axis, and allows only light polarized in a specific direction to pass therethrough. For example, when light traveling in a direction from the second polarizing plate 22 to the first polarizing plate 21 (see an arrow "L" in FIG. 2) is incident on the light-modulating cell 10, only light polarized in the same direction as the polarization axis of the second polarizing plate 22 out of the light passes through the second polarizing plate 22 and enters the second film substrate 24, and further, only light polarized in the same direction as the polarization axis of the first polarizing plate 21 out of the light traveling from the first film substrate 23 toward the first polarizing plate 21 passes through the first polarizing plate 21 and travels toward the outside. An arrangement form of the first polarizing plate 21 and the second polarizing plate 22 is not particularly limited, and the arrangement form of the first polarizing plate 21 and the second polarizing plate 22 is determined in relation to an alignment state of the liquid crystal molecules contained in the liquid crystal layer 29.

Representative examples thereof include a state called "cross nicol" where the first polarizing plate 21 and the second polarizing plate 22 are arranged so as to have the polarization axes orthogonal to each other and a state called "parallel nicol" where the first polarizing plate 21 and the second polarizing plate 22 are arranged so as to have the polarization axes parallel to each other.

For example, when it is desired to improve the rigidity of the light-modulating cell 10, the first film substrate 23 and the second film substrate 24 are configured using a transparent member having excellent rigidity. In addition, it is easy to perform "bonding of the light-modulating cell 10 to a curved surface", which is difficult in the case of using a glass substrate, by using the first film substrate 23 and second film substrate 24 each of which has a sufficiently flexible film shape.

The first transparent electrode 25 and the second transparent electrode 26 apply a desired electric field to the liquid crystal layer 29 as a voltage is applied thereto by the light-modulating controller 12 (see FIG. 1). Each member forming the first transparent electrode 25 or the second transparent electrode 26 and an arrangement form of the first transparent electrode 25 and the second transparent electrode 26 are not particularly limited. For example, the first transparent electrode 25 and the second transparent electrode 26 can be formed using a member excellent in visible light transmissivity and conductivity such as indium tin oxide (ITO).

The first alignment film 27 and the second alignment film 28 are members configured to align the liquid crystal molecules contained in the liquid crystal layer 29 in a desired direction. Although a method of aligning the liquid crystal layer 29 according to the first alignment film 27 and the second alignment film 28 is not particularly limited, a twisted nematic (TN) liquid crystal in which molecular arrangement (molecular orientation) is twisted by 90 degrees is used in this example. Incidentally, a method of imparting alignment functions of the first alignment film 27 and the second alignment film 28 is not particularly limited, and, for example, alignment directions of the first alignment film 27 and the second alignment film 28 may be defined by rubbing using a member such as nylon, or the alignment directions of the first alignment film 27 and the second alignment film 28 may be defined by irradiation with linearly polarized ultraviolet rays.

Each of the plurality of spacers 30 is in surface contact with at least any one of the pair of alignment films (the first alignment film 27 in this example), and has a tapered shape that tapers from one of the pair of alignment films (the second alignment film 28 in this example) toward the other alignment film (the first alignment film 27 in this example). In this example, each of the plurality of spacers 30 has a flat first bottom portion 31 in contact with one of a pair of alignment films (the first alignment film 27 in this example) and a second bottom portion 32 opposing the first bottom portion 31. Incidentally, a portion of each of the spacers 30 on the boundary surface Sb1 between the second alignment film 28 and the liquid crystal layer 29 is illustrated as the second bottom portion 32 for the sake of convenience in FIG. 2, but a portion of each of the spacers 30 on the boundary surface Sb3 between the second alignment film 28 and the second transparent electrode 26 may be regarded as the second bottom portion 32 when each of the spacers 30 extends from the boundary surface Sb3 between the second alignment film 28 and the second transparent electrode 26 as indicated by reference sign "30a".

The spacer 30 illustrated in FIG. 2 has a truncated conical shape in which a diameter linearly changes in accordance with a distance from the second alignment film 28 and an angle of a side surface is substantially constant, but is not limited thereto. The diameter of the spacer 30 may change nonlinearly in accordance with the distance from the second alignment film 28, and, for example, the diameter may change exponentially with respect to the distance from the second alignment film 28, or the diameter may change in proportion to a square root of the distance from the second alignment film 28. In addition, the spacer 30 has the tapered shape (forward tapered shape) that tapers from the second alignment film 28 toward the first alignment film 27 in the example illustrated in FIG. 2, but may have a tapered shape (inverted tapered shape) that tapers from the first alignment film 27 toward the second alignment film 28.

Incidentally, a taper angle $\theta$ of each of the plurality of spacers 30 is preferably in a range of 75° or larger and 85° or smaller from the viewpoint of realizing the desired orientation of the liquid crystal layer 29 while securing the function as the spacer.

Figure 3:
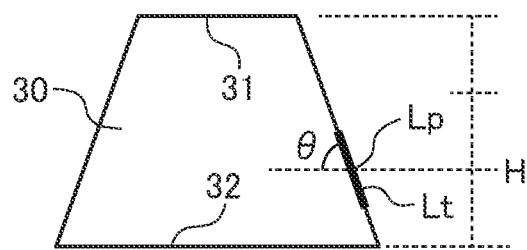
FIG. 3 is a view for describing a taper angle of each spacer.

FIG. 3 is a view for describing the taper angle $\theta$ of each of the spacers 30. The taper angle $\theta$ of each of the spacers 30 referred to herein is represented by an angle formed between a tangent Lt of a side portion Lp of each of the spacers 30 at a position, separated from the lowermost position of each of the spacers 30 by one third (⅓) of a distance between both end portions of each of the spacers 30 (between the uppermost position (the first bottom portion 31) and the lowermost position (the second bottom portion 32) of each of the spacers 30 in FIG. 3) with respect to a stacking direction in a cross section of each of the spacers 30, and a line H extending in the horizontal direction vertical to the stacking direction. That is, the taper angle $\theta$ of each of the spacers 30 is represented by the angle formed between the tangent Lt of the portion Lp of a side surface of each of the spacers 30, separated from the second bottom portion 32 by the distance corresponding to one third of the entire length of each of the spacers 30 in the stacking direction, and the line H extending in the horizontal direction.

In addition, at least some of the plurality of spacers 30 have an inconstant distance to the other spacer 30 positioned at the closest distance in the present embodiment. That is, in the example illustrated in FIG. 2, a "distance (interval) D1 between the center spacer 30 and the left spacer 30" and a "distance D2 between the center spacer 30 and the right spacer 30" satisfy a relationship "D1≠D2".

The distance between the spacers 30 indicating the "distance to the other spacer 30 positioned at the closest distance" is typically represented by the closest distance between the spacers 30. For example, in the case of the spacer 30 having the forward tapered shape illustrated in FIG. 2 (that is, a size of the first bottom portion 31<a size of the second bottom portion 32), the "distance between the spacers 30" is represented by a distance between the second bottom portions 32. On the other hand, in the case of the spacer 30 having the inverted tapered shape (that is, the size of the first bottom portion 31>the size of the second bottom portion 32), the "distance between the spacers 30" is represented by a distance between the first bottom portions 31.

Figure 4:
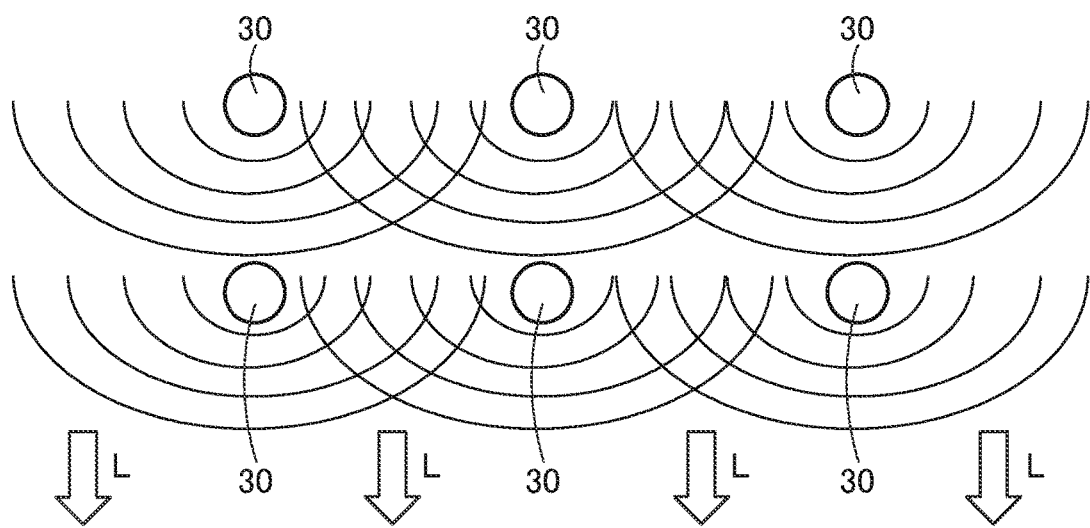
FIG. 4 is a view for describing influence of interference of diffracted light in a case where the spacers are regularly arranged.

FIG. 4 is a view for describing influence of interference of diffracted light in a case where the spacers 30 are regularly arranged. Incidentally, FIG. 4 illustrates a case where the plurality of spacers 30 are two-dimensionally arranged with respect to two directions, that is, a light traveling direction L and a direction orthogonal to the traveling direction L, but the similar influence is exerted even in a case where the spacers 30 are arranged one-dimensionally in the direction orthogonal to the light traveling direction L.

When the spacers 30 are regularly arranged and the distance between the adjacent spacers 30 (in particular, the distance with respect to the direction orthogonal to the light traveling direction L) is constant as illustrated in FIG. 4, interference of diffracted light periodically occurs, and a region of visible light is enlarged. Thus, when assuming light from a point light source, the diffracted beams of light intensify each other at a constant period if the distance between the adjacent spacers 30 is constant, and thus, the influence of interference of diffracted light increases so that the light from the point light source looks greatly blurred.

Figure 5:
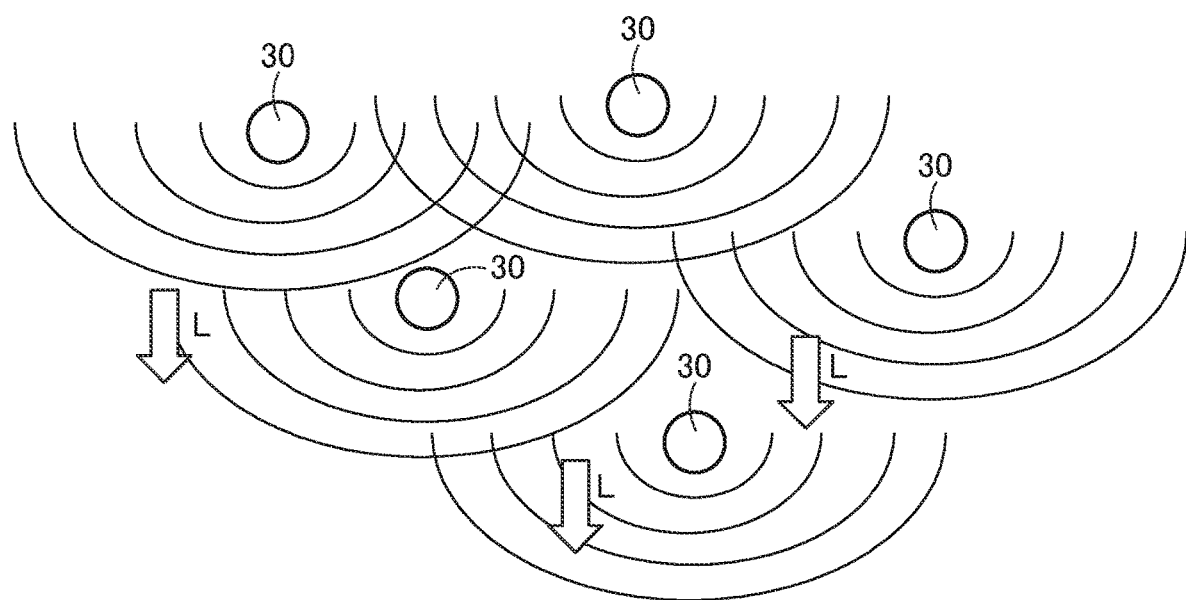
FIG. 5 is a view for describing influence of interference of diffracted light in a case where the spacers are irregularly (randomly) arranged.

FIG. 5 is a view for describing influence of interference of diffracted light in a case where the spacers 30 are irregularly (randomly) arranged. Incidentally, FIG. 5 illustrates a case where the plurality of spacers 30 are two-dimensionally arranged with respect to two directions, that is, the light traveling direction L and the direction orthogonal to the traveling direction L, but the similar influence is exerted even in a case where the spacers 30 are arranged one-dimensionally in the direction orthogonal to the light traveling direction L.

When the spacers 30 are irregularly arranged and the distance between the adjacent spacers 30 (in particular, the distance with respect to the direction orthogonal to the light traveling direction L) is inconstant as illustrated in FIG. 5, the interference of diffracted light does not periodically occur, and the region of visible light does not change. Thus, when assuming the light from the point light source, an interference zone of diffracted light becomes random and the light intensity of extent where it is difficult to visually recognize the influence of interference of diffracted light is realized if the distance between the adjacent spacers 30 is ununiform, and thus, it is possible to view the light from the point light source with its original size.

Therefore, it is possible to reduce the influence of interference of diffracted light generated by the plurality of spacers 30 and to provide the observation light excellent in visibility by using the light-modulating cell 10 in which "at least some of the plurality of spacers 30 have the inconstant distance to the other spacer 30 positioned at the closest distance" according to the present embodiment.

A method of determining specific positions of "the plurality of spacers 30 whose distance to the other spacer 30 positioned at the closest distance is inconstant" is not particularly limited, and can be appropriately determined based on an arbitrary method. For example, the specific positions of the plurality of spacers 30 may be determined following a method of defining a generating point of the Voronoi diagram. In addition, the specific positions of the plurality of spacers 30 may be determined by, for example, defining the maximum value and the minimum value of the distance between the two spacers 30, adjacent to each other, and using these values as constraint conditions.

Incidentally, it is unnecessary for all the spacers 30 provided in the light-modulating cell 10 to satisfy the condition that the "distance to the other spacer 30 positioned at the closest distance is inconstant", and it is possible to reduce the influence of interference of diffracted light and to provide the observation light excellent in visibility even when only some of the spacers 30 satisfy the condition that the "distance to the other spacer 30 positioned at the closest distance is inconstant".

In addition, all the spacers 30 provided in the light-modulating cell 10 may be randomly arranged with no mutual relation, but the plurality of spacers 30 provided in the light-modulating cell 10 may be configured by repeatedly arranging the unit patterns each of which is formed of a plurality of spacers 30 (three or more spacers 30) arranged with a predetermined relative positional relationship.

Figure 6:
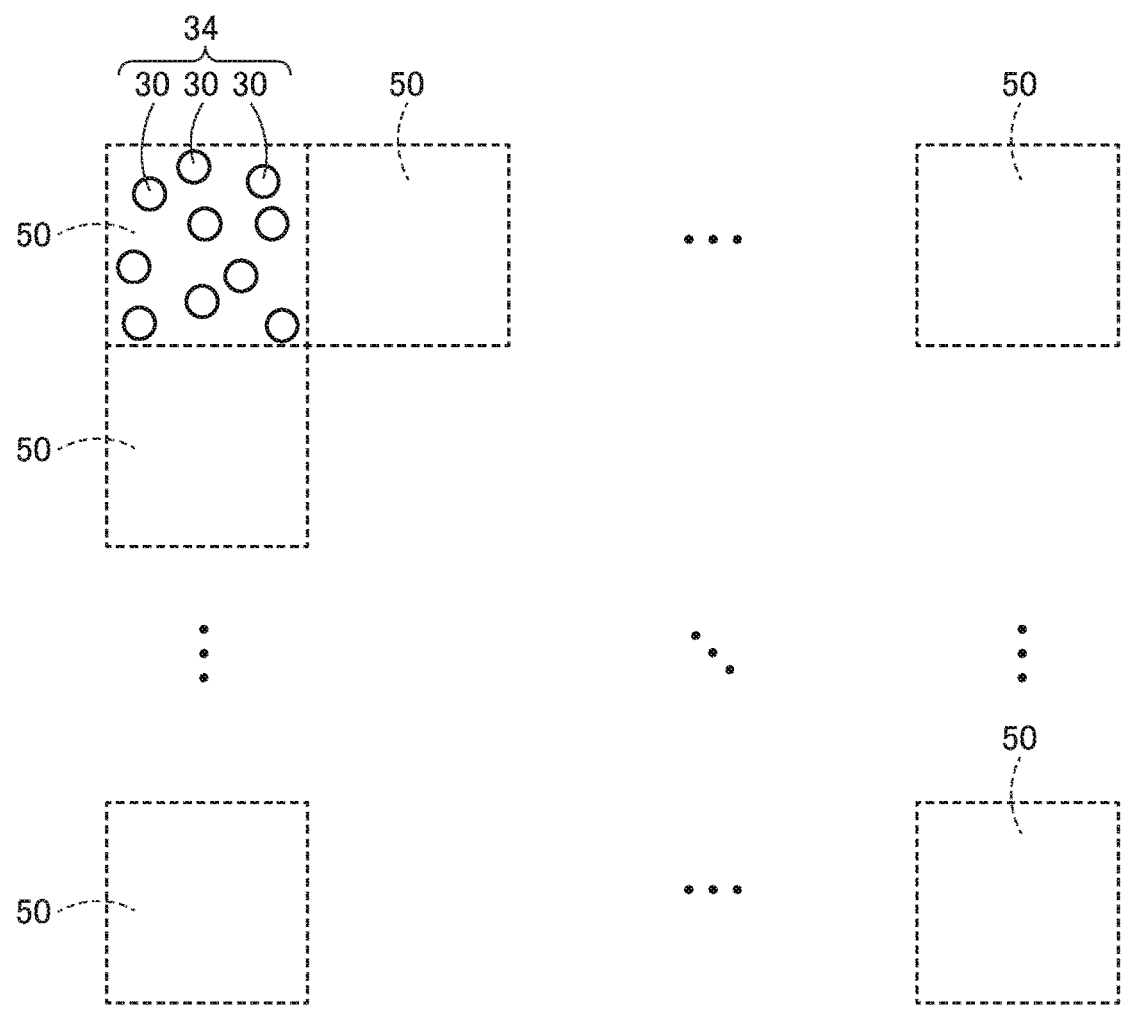
FIG. 6 is a plan view illustrating a concept of an arrangement example (modified example) of the spacers.

FIG. 6 is a plan view illustrating a concept of an arrangement example (modified example) of the spacers 30. In the example illustrated in FIG. 6, a condition that "the distance to the other spacer 30, positioned at the closest distance, is inconstant" is satisfied with respect to the plurality of spacers 30 (unit patterns 34) included in a predetermined unit pattern area 50. Further, the plurality of spacers 30 provided in the light-modulating cells 10 are configured by repeatedly arranging the plurality of spacers 30 (unit patterns 34) included in the unit pattern area 50. Although a shape and a size of the unit pattern area 50 are not particularly limited, it is preferable to define a rectangular area defined depending on the entire area where the spacers 30 are provided as the unit pattern area 50, and, for example, it is also possible to define a square area having one side of 10 mm as the unit pattern area 50. In addition, the specific number and arrangement of the spacers 30 included in the unit pattern area 50 are not particularly limited either.

As the plurality of spacers 30 (unit patterns 34) included in the unit pattern area 50 are repeatedly arranged in this manner, it is possible to easily provide a large number of the spacers 30 while effectively reducing the influence of interference of diffracted light generated by the respective spacers 30. Therefore, this modified example is suitable, for example, when the area where the spacers 30 are provided is wide.

Incidentally, the spacer 30 according to the present embodiment has the columnar shape as described above, and thus, is excellent in not only a position fixing property, but also an optical alignment property.

Figures 7A, 7B:
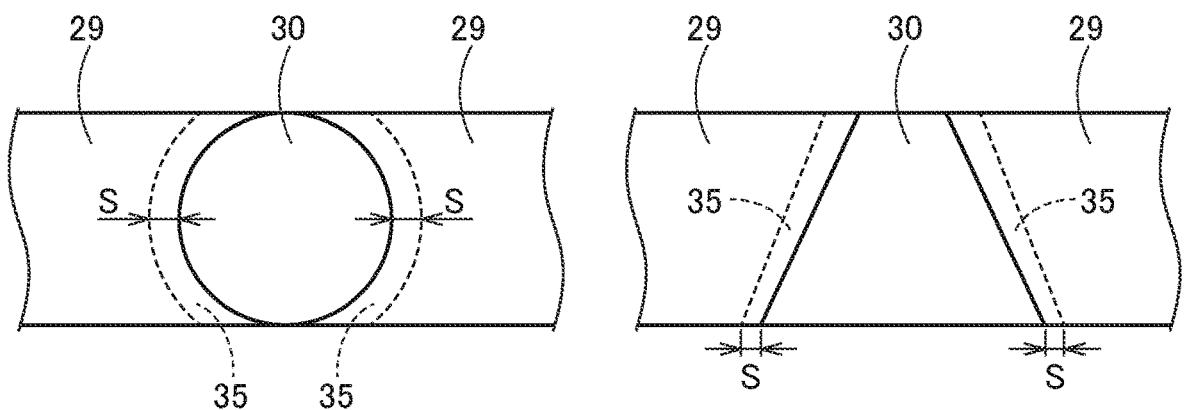
FIGS. 7A and 7B each illustrate an enlarged sectional shape of a liquid crystal layer and a spacer.

FIGS. 7A and 7B each illustrate an enlarged sectional shape of the liquid crystal layer 29 and the spacer 30, FIG. 7A illustrates a spherical spacer 30, and FIG. 7B illustrates the columnar (truncated conical) spacer 30 illustrated in FIG. 2. In general, the spacer 30 affects the orientation of the liquid crystal layer 29, and thus, the orientation of the liquid crystal layer 29 tends to be disturbed in the vicinity of the spacer 30. Therefore, regions in the vicinity of the spacer 30 indicated by reference sign "35" in FIGS. 7A and 7B become unstable areas relating to the orientation of the liquid crystal layer 29, and the light passing through the unstable area 35 may be polarized in an unintended direction in some cases. When comparing the spherical spacer 30 (see FIG. 7A) with the columnar spacer 30 (see FIG. 7B), in general, the columnar spacer 30 has smaller influence (see reference sign "S" in FIGS. 7A and 7B) on the unstable area 35 than the spherical spacer 30. That is, the unstable area 35 is defined depending on a surface shape of the spacer 30, and a "range where light passes through the unstable area 35 (see reference sign "S" in FIGS. 7A and 7B)" tends to be larger in the "spherical spacer 30 (having a tangent in the same direction as the light traveling direction)" than in the columnar spacer 30 having a tapered shape (not having the tangent in the same direction as the light traveling direction)".

According to the columnar spacer 30 excellent in the position fixing property and optical alignment property as described above, it is possible not only to accurately serve the intrinsic function of the spacer such as securing a space between the alignment films (the first alignment film 27 and the second alignment film 28) even under environment where the external force such as vibration is applied, but also to accurately control a polarization state of light passing through the liquid crystal layer 29. Therefore, the light-modulating cell 10 (the spacer 30 (see FIGS. 7A and 7B)) according to this embodiment described above can be suitably used, for example, in a window (for example, a skylight of a house) or the like. In particular, the skylight of the house or the like does not necessarily have a flat structure in design, and may be required to have a curved structure. Even in such a case, it is also possible to curve all or a part of at least one of the pair of polarizing plates (the first polarizing plate 21 and the second polarizing plate 22), to curve other members (see reference signs "23" to "30" in FIG. 2), and to curve the entire light-modulating cell 10 according to the light-modulating cell 10 (spacer 30) of this embodiment described above.

OTHER CONFIGURATION EXAMPLES

The specific configuration of the light-modulating cell 10 is not limited to the above-described example, and the present invention is also applicable to another light-modulating cell 10 that includes: a pair of film substrates (a first film substrate 23 and a second film substrate 24); a pair of transparent electrodes (a first transparent electrode 25 and a second transparent electrode 26); a pair of alignment films (a first alignment film 27 and a second alignment film 28); a plurality of spacers 30; and a liquid crystal layer 29.

Figure 8:
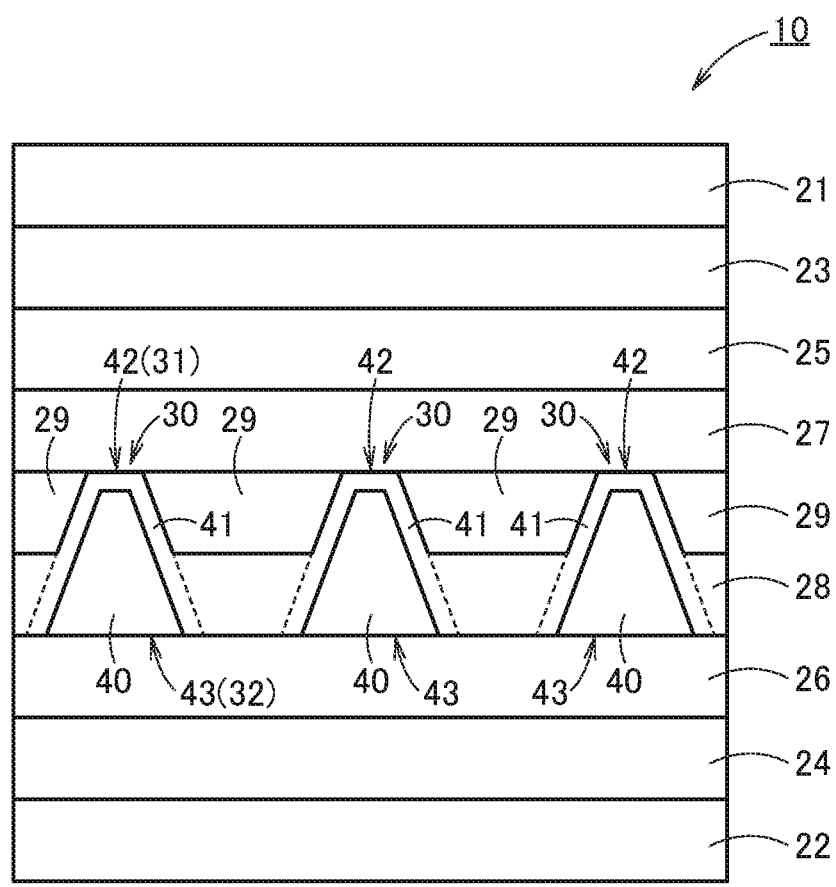
FIG. 8 is a view illustrating another example of a cross section of a light-modulating cell.

FIG. 8 is a view illustrating another example of a cross section of the light-modulating cell 10. Each of the plurality of spacers 30 in this example has a multilayer structure (two-layer structure in this example), and is provided so as to penetrate through the second alignment film 28 and the liquid crystal layer 29.

That is, each of the spacers 30 includes a truncated conical core portion 40 and a covering portion 41 covering at least a part of the core portion 40, and penetrates through one of the pair of alignment films (the second alignment film 28 in this example) and the liquid crystal layer 29. As illustrated in FIG. 8, the covering portion 41 of this example covers an upper surface (upper bottom surface) of the core portion 40 on the first alignment film 27 side and a side surface (outer surface) of the core portion 40 to be interposed between the core portion 40 and the first alignment film 27, between the core portion 40 and the liquid crystal layer 29, and between the core portion 40 and the second alignment film 28. Incidentally, the covering portion 41 of this example is formed using the same member as the second alignment film 28 and is formed integrally with the second alignment film 28. Therefore, the "covering portion 41 interposed between the core portion 40 and the second alignment film 28 (see dotted-line portions in FIG. 10)" substantially forms a part of the second alignment film 28, and practically, there is no boundary surface between the covering portion 41 and the second alignment film 28. On the other hand, a lower surface (lower bottom surface) of the core portion 40 on the second transparent electrode 26 side is in contact with the second transparent electrode 26, and the covering portion 41 is not interposed between the core portion 40 and the second transparent electrode 26.

Therefore, each of the spacers 30 of this example has a first support surface 42 that is in two-dimensional contact with the other alignment film (the first alignment film 27 in this example) of the pair of alignment films, and a second support surface 43 being in two-dimensional contact with one of the pair of transparent electrodes (the second transparent electrode 26 in this example). The first support surface 42 is formed by the covering portion 41 and forms the above-described first bottom portion 31. In addition, the second support surface 43 is formed by the core portion 40 and the covering portion 41 (the covering portion 41 integrally formed with the second alignment film 28), and forms the above-described second bottom portion 32. Incidentally, the second support surface 43 (the second bottom portion 32) of the spacer 30 is formed by the core portion 40 and the covering portion 41, and only a part of the second support surface 43 is formed by the core portion 40 in this example, but the entire second support surface 43 may be formed by the core portion 40.

The other configurations are the same as those of the light-modulating cell 10 illustrated in FIG. 2, and the same or similar configurations as those of the light-modulating cell 10 illustrated in FIG. 2 will be denoted by the same reference signs, and the detailed description thereof will be omitted.

According to the light-modulating cell 10 of this example, it is possible to highly accurately and simply form the spacer 30 based on a photolithography technique to be described later. In particular, it is possible to form the covering portion 41 (the first support surface 42) and the first alignment film 27 using the same member by forming the covering portion 41 of each of the spacers 30 using the same member as the second alignment film 28 and forming the first alignment film 27 and the second alignment film 28 using the same member.

In addition, it is possible to provide the spacer 30 excellent in a position fixing property by providing each of the spacers 30 so as to penetrate through the second alignment film 28 and the liquid crystal layer 29. That is, each of the spacers 30 is also supported by the second alignment film 28 so that it is possible to effectively prevent each of the spacers 30 from moving due to an external force or the like. Incidentally, the first alignment film 27 and the second alignment film 28 are illustrated to have the same thickness as the liquid crystal layer 29 in the drawing, but the actual first alignment film 27 and second alignment film 28 are formed to be extremely thin.

In addition, since each of the spacers 30 has the multilayer structure, it is possible to easily impart various characteristics to each of the spacers 30. For example, it is possible to realize the spacer 30 excellent in surface characteristics while securing high proof stress performance by forming the covering portion 41 with a member having small influence on the liquid crystal layer 29 while forming the core portion 40 of each of the spacers 30 with a member having excellent rigidity. Incidentally, each of the spacers 30 has the two-layer structure in the above-described example, but each of the spacers 30 may be configured using three or more layers.

Even in this example, the periodicity of mutual interference of diffracted light generated by the respective spacers 30 disappears by making a distance between the spacers 30 inconstant, and it is possible to reduce the influence of interference of diffracted light generated by the plurality of spacers 30 and to provide observation light excellent in visibility.

<Guest-Host Liquid Crystal>

The present invention is also applicable to a light-modulating cell 10 employing a guest-host liquid crystal. That is, a liquid crystal layer 29 may contain a dichroic pigment (guest) and a liquid crystal (host). The dichroic pigment contained in the liquid crystal layer 29 is preferably a coloring material that has a light shielding property and capable of shielding (absorbing) desired visible light.

Figure 10A:
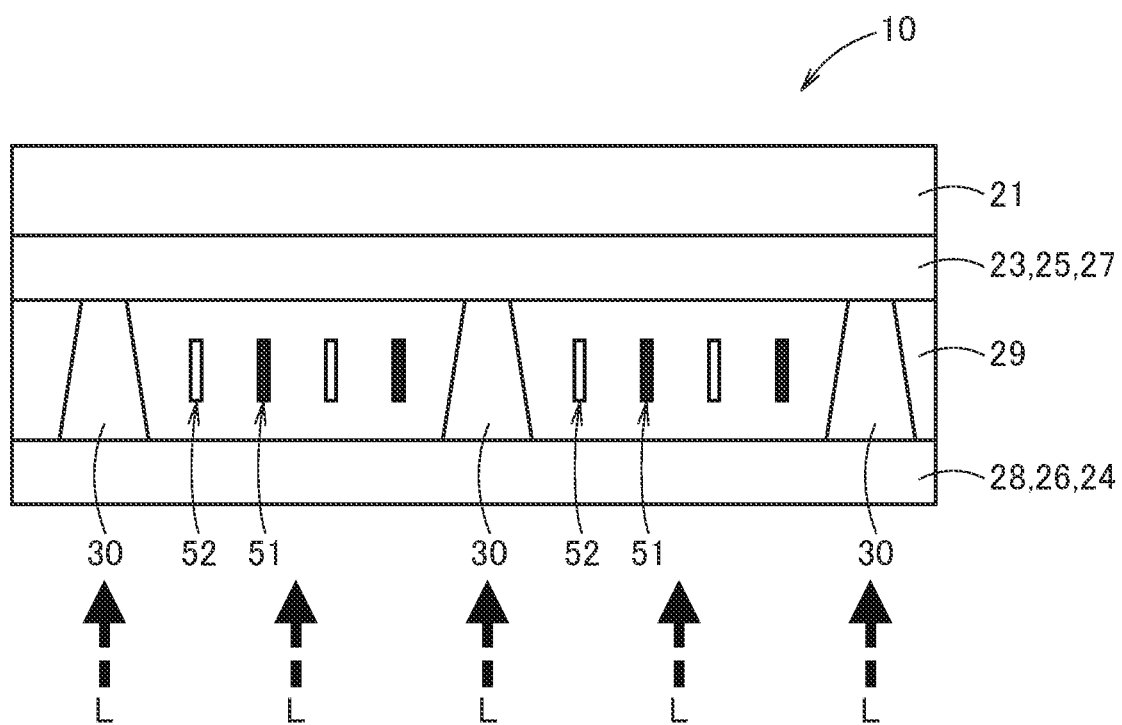
FIGS. 10A and 10B are conceptual views for describing the same light-modulating cell (a light transmitting state) as FIGS. 9A and 9B.
Figure 10B:
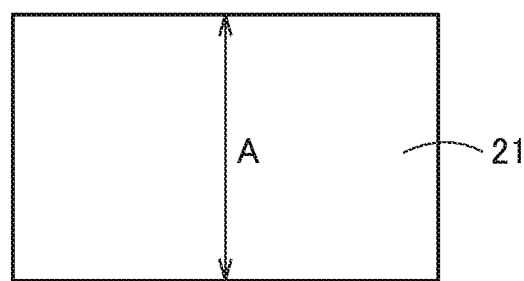
Figure 11:
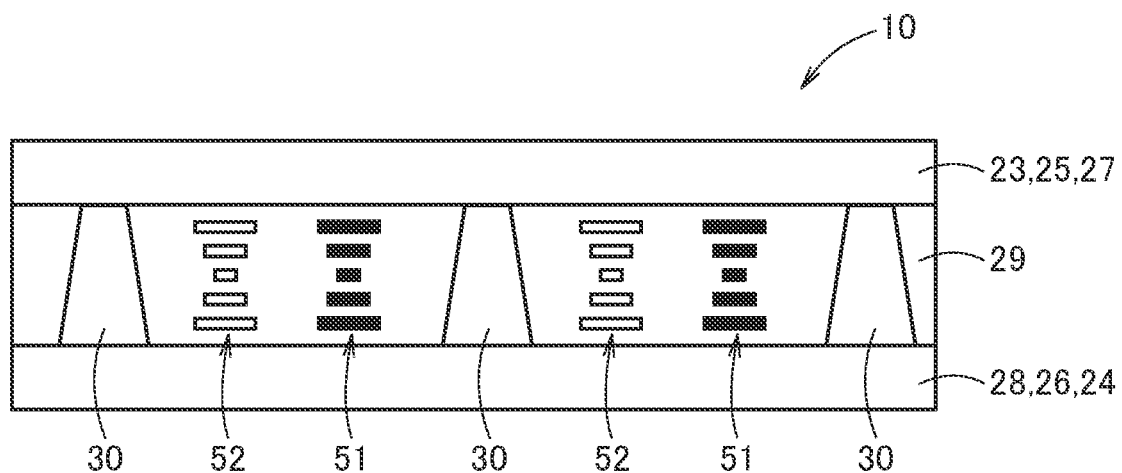
FIG. 11 is a conceptual view for describing another example (a light shielding state) of the light-modulating cell employing the guest-host liquid crystal, and illustrates a cross section of the light-modulating cell.
Figure 12:
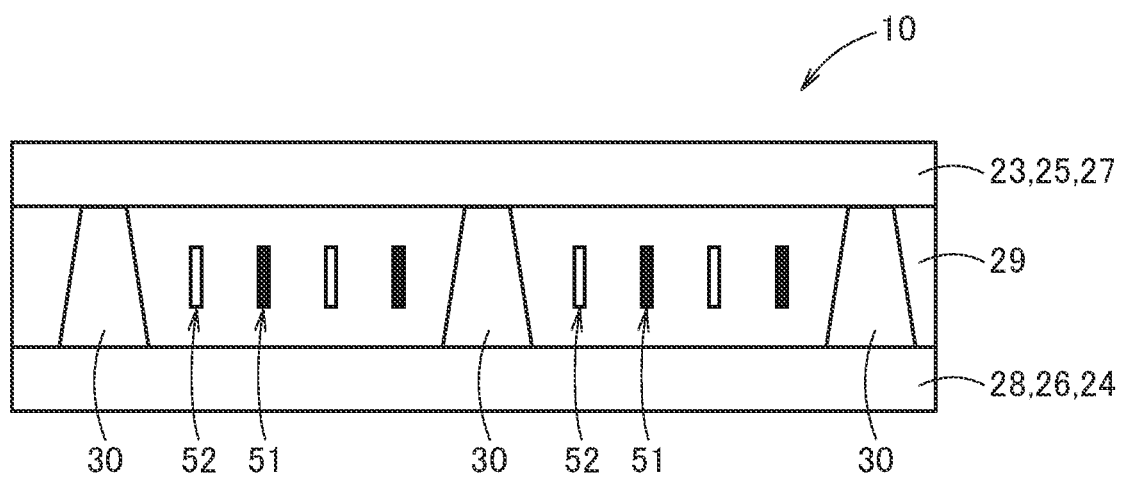
FIG. 12 is a conceptual view for describing the same light-modulating cell (a light transmitting state) as FIG. 11, and illustrates a cross section of a light-modulating cell 10.

A specific configuration of the light-modulating cell 10 employing the guest-host liquid crystal to which the present invention is applicable is not particularly limited. For example, only one polarizing plate may be provided as illustrated in FIGS. 9A to 10B to be described later, or a polarizing plate is not necessarily provided as illustrated in FIGS. 11 and 12 to be described later, instead of providing a pair of polarizing plates (see the first polarizing plate 21 and the second polarizing plate 22 in FIG. 2). Hereinafter, a typical example of the light-modulating cell 10 employing the guest-host liquid crystal will be described.

Figure 9A:
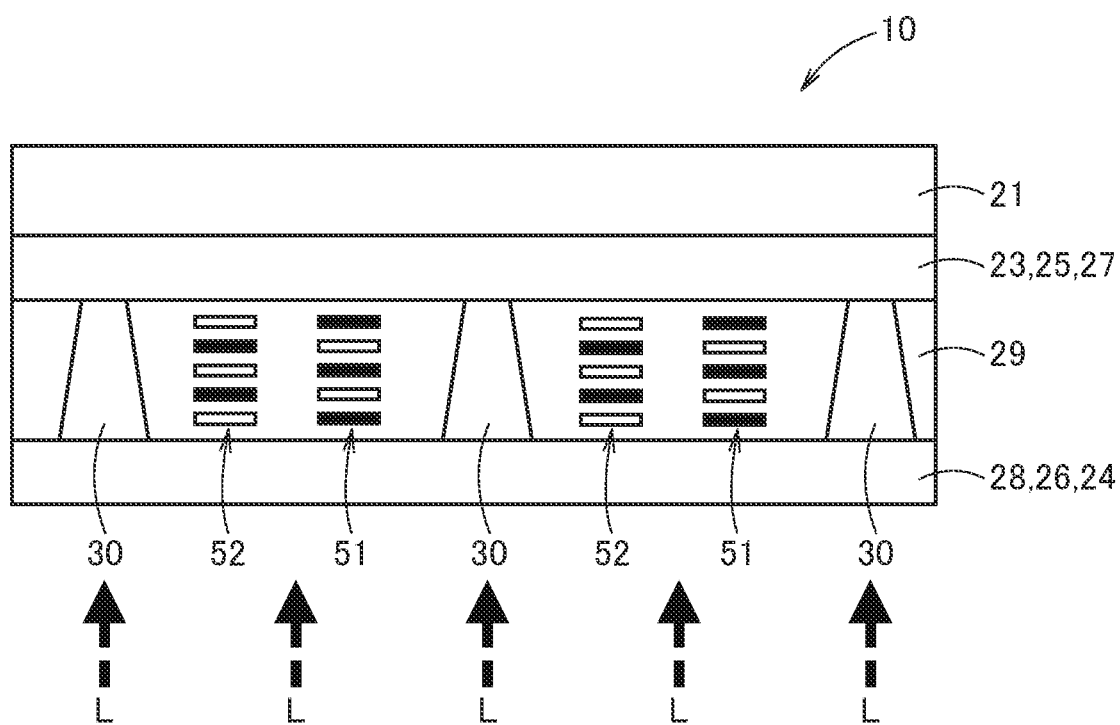
FIGS. 9A and 9B are conceptual views for describing an example (light shielding state) of a light-modulating cell employing a guest-host liquid crystal.
Figure 9B:
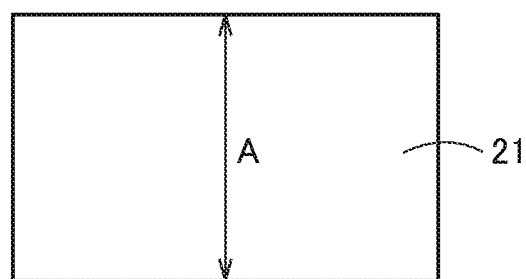

FIGS. 9A and 9B are conceptual views for describing an example (light shielding state) of the light-modulating cell 10 employing the guest-host liquid crystal, FIG. 9A is a cross-sectional view of the light-modulating cell 10, and FIG. 9B is a plan view of a first polarizing plate 21 in which an absorption axis direction is indicated by an arrow "A". FIGS. 10A and 10B are conceptual views for describing the same light-modulating cell 10 (a light transmitting state) as FIGS. 9A and 9B, FIG. 10A is a cross-sectional view of the light-modulating cell 10, and FIG. 10B is a plan view of the first polarizing plate 21 in which the absorption axis direction is indicated by an arrow "A". Incidentally, an absorption axis of the first polarizing plate 21 and a polarization axis (light transmission axis) extend in directions vertical to each other.

The light-modulating cell 10 of this example has basically the same configuration as that of the light-modulating cell 10 illustrated in FIG. 2. That is, the light-modulating cell 10 illustrated in FIGS. 9A to 10B also includes: a pair of film substrates (a first film substrate 23 and a second film substrate 24); a pair of transparent electrodes (a first transparent electrode 25 and a second transparent electrode 26) arranged between the pair of film substrates; a pair of alignment films (a first alignment film 27 and a second alignment film 28) arranged between the pair of transparent electrodes; a plurality of spacers 30 supporting at least any one of the pair of alignment films and being in two-dimensional contact with at least any one of the pair of alignment films; and the liquid crystal layer 29 arranged between the plurality of spacers 30 between the pair of alignment films, and in which at least some of the plurality of spacers 30 have an inconstant distance to the other spacer 30 positioned at the closest distance, which is similar to the light-modulating cell 10 illustrated in FIG. 2. In the light-modulating cell 10 illustrated in FIGS. 9A to 10B, however, only one polarizing plate (the first polarizing plate 21 in this example) is provided on the opposite side of the pair of transparent electrodes with one of the pair of film substrates (the first film substrate 23 in this example) interposed therebetween. In addition, the liquid crystal layer 29 is configured using the guest-host liquid crystal containing dichroic pigments (dyes) 51 and liquid crystals 52.

The dichroic pigments 51 exist in a dispersed state in the liquid crystals 52, have the same alignment as the liquid crystals 52, and are basically aligned in the same direction as the liquid crystals 52.

In this example, when a voltage between the pair of transparent electrodes (the first transparent electrode 25 and the second transparent electrode 26) is in an OFF state, the dichroic pigment 51 and the liquid crystal 52 are aligned in the horizontal direction (particularly, a direction vertical to the absorption axis direction A of the first polarizing plate 21 (that is, the same direction as the polarization axis of the first polarizing plate 21)) vertical to the light traveling direction L (that is, the stacking direction of the light-modulating cell 10) (see FIG. 9A). On the other hand, when the voltage between the pair of transparent electrodes (the first transparent electrode 25 and the second transparent electrode 26) is in an ON state, the dichroic pigment 51 and the liquid crystal 52 are aligned in the vertical direction (that is, the light traveling direction L) (see FIG. 10A). Incidentally, FIG. 9A and FIG. 10A conceptually illustrate the dichroic pigment 51 and the liquid crystal 52 in order to illustrate the alignment directions of the dichroic pigment 51 and the liquid crystal 52.

For example, when no voltage is applied to the first transparent electrode 25 and the second transparent electrode 26 by a light-modulating controller 12 (see FIG. 1), a desired electric field is not applied to the liquid crystal layer 29, and the dichroic pigment 51 and the liquid crystal 52 are aligned in the horizontal direction (see FIG. 9A). In this case, light vibrating in the direction orthogonal to the absorption axis direction A of the first polarizing plate 21 is shielded by the dichroic pigment 51, and light vibrating in the other direction is shielded by the first polarizing plate 21. Therefore, light traveling in the direction from the second film substrate 24 toward the first polarizing plate 21 (see an arrow "L") is shielded by the dichroic pigment 51 and the first polarizing plate 21.

Incidentally, the spacers 30 of this example are also irregularly arranged and a distance between the adjacent spacers 30 (particularly, a distance in the direction orthogonal to the light traveling direction L) is inconstant, which is similar to the light-modulating cell 10 illustrated in FIG. 2. Thus, the interference of diffracted light generated by the respective spacers 30 does not periodically occur, and it is possible to reduce the influence of interference of diffracted light generated by the plurality of spacers 30 and provide observation light excellent in visibility.

On the other hand, when a voltage is applied to the first transparent electrode 25 and the second transparent electrode 26 by the light-modulating controller 12 (see FIG. 1), the desired electric field is applied to the liquid crystal layer 29, and the dichroic pigment 51 and the liquid crystal 52 are aligned in the vertical direction (see FIG. 10A). In this case, the light shielding performance of the dichroic pigment 51 with respect to the light passing through the liquid crystal layer 29 is hardly exerted regardless of the light vibrating direction, and the light entering the liquid crystal layer 29 passes through the liquid crystal layer 29 (the dichroic pigment 51 and the liquid crystal 52) with a high probability. In addition, the light vibrating in parallel with the polarization axis (light transmission axis) of the first polarizing plate 21 (light vibrating in the direction vertical to the absorption axis direction A of the first polarizing plate 21 in this example) passes through the first polarizing plate 21 and is emitted from the light-modulating cell 10.

Even in the case of using the guest-host liquid crystal layer 29 illustrated in FIGS. 9A to 10B as described above, it is possible to appropriately change a light-transmitting property of the light-modulating cell 10 by controlling the voltage to be applied to the first transparent electrode 25 and the second transparent electrode 26.

Incidentally, the other configurations of the light-modulating cell 10 of this example can be made the same as those of the light-modulating cell 10 illustrated in FIG. 2. For example, each of the spacers 30 can include a flat first bottom portion 31, which is made of a photocurable resin and in contact with one (for example, the first alignment film 27) of the pair of alignment films, and a second bottom portion 32 opposing the first bottom portion 31, and have a tapered shape (for example, a taper angle in a range of 75° or larger and 85° or smaller). In addition, the plurality of spacers 30 may be configured by repeatedly arranging unit patterns (see reference sign "50" in FIG. 6) each of which is formed of three or more spacers 30 arranged with a predetermined relative positional relationship. In addition, at least any one of the pair of film substrates (the first film substrate 23 and the second film substrate 24) may be partially or entirely curved. In addition, each of the plurality of spacers 30 may include a core portion 40 and a covering portion 41 covering at least a part of the core portion 40, penetrate through one (for example, the second alignment film 28) of the pair of alignment films and the liquid crystal layer 29, and have a first support surface 42 being in two-dimensional contact with the other alignment film (for example, the first alignment film 27) of the pair of alignment films and a second support surface 43 being in two-dimensional contact with one (for example, the second transparent electrode 26) of the pair of electrodes, and the first support surface 42 may be formed by the covering portion 41, and at least a part of the second support surface 43 may be formed by the core portion 40.

Incidentally, the case of using the so-called normally black type alignment films 27 and 28 and liquid crystal layer 29 has been described as above regarding the light-modulating cell 10 illustrated in FIGS. 9A to 10B, but so-called normally white type alignment films 27 and 28 and liquid crystal layer 29 may be used. That is, in the case of the normally black type, it is necessary to cause the dichroic pigment 51 and the liquid crystal 52 to be aligned in the vertical direction when the electric field is applied to the liquid crystal layer 29 by applying the voltage between the electrodes 25 and 26 as described above, and thus, a horizontal alignment film is used as the alignment films 27 and 28, and a positive liquid crystal is used for the liquid crystal layer 29. On the other hand, in the case of the normally white type, it is necessary to cause the dichroic pigment 51 and the liquid crystal 52 to be aligned in the horizontal direction as illustrated in FIG. 9A when the electric field is applied to the liquid crystal layer 29 by applying the voltage between the electrodes 25 and 26, and thus, a vertical alignment film is used as the alignment films 27 and 28, and a negative liquid crystal is used for the liquid crystal layer 29. The above-described operational effect that the influence of the diffracted light generated by the spacer 30 can be reduced by irregularly arranging the spacer 30 is valid not only in the light-modulating cell 10 employing the guest-host liquid crystal of the normally black type but also in the light-modulating cell 10 employing the guest-host liquid crystal of the normally white type.

FIG. 11 is a conceptual view for describing another example (a light shielding state) of a light-modulating cell 10 employing a guest-host liquid crystal, and illustrates a cross section of the light-modulating cell 10. FIG. 12 is a conceptual view for describing the same light-modulating cell 10 (a light transmitting state) as FIG. 11, and illustrates a cross section of the light-modulating cell 10.

The light-modulating cell 10 of this example has basically the same configuration as that of the light-modulating cell 10 illustrated in FIG. 2, but has a liquid crystal layer 29 of the guest-host type containing a dichroic pigment (dye) 51 and a liquid crystal 52 without providing a polarizing plate (a first polarizing plate 21 and a second polarizing plate 22). That is, the dichroic pigments 51 exist in a dispersed state in the liquid crystals 52, have the same alignment as the liquid crystals 52, and are basically aligned in the same direction as the liquid crystals 52.

In this example, when a voltage between a pair of transparent electrodes (a first transparent electrode 25 and a second transparent electrode 26) is in an OFF state, the dichroic pigment 51 and the liquid crystal 52 are aligned in the horizontal direction (that is, the direction vertical to the light traveling direction L) (see FIG. 11). In particular, it is preferable that the alignment of the dichroic pigment 51 and the liquid crystal 52 of this example be twisted by 180 degrees or more with respect to the horizontal direction in a state where no electric field is applied so that the dichroic pigments 51 are directed in every horizontal direction. On the other hand, when the voltage between the pair of transparent electrodes (the first transparent electrode 25 and the second transparent electrode 26) is in an ON state, the dichroic pigment 51 and the liquid crystal 52 are aligned in the vertical direction (that is, the light traveling direction L) (see FIG. 12). Incidentally, FIGS. 11 and 12 conceptually illustrate the dichroic pigment 51 and the liquid crystal 52 in order to illustrate the alignment directions of the dichroic pigment 51 and the liquid crystal 52.

For example, when no voltage is applied to the first transparent electrode 25 and the second transparent electrode 26 by a light-modulating controller 12 (see FIG. 1), a desired electric field is not applied to the liquid crystal layer 29, and the dichroic pigment 51 and the liquid crystal 52 are aligned in the horizontal direction (see FIG. 11). As a result, the light entering the liquid crystal layer 29 is shielded (absorbed) by the dichroic pigment 51. Incidentally, the spacers 30 of this example are also irregularly arranged and a distance between the adjacent spacers 30 (particularly, a distance in the direction orthogonal to the light traveling direction L) is inconstant, which is similar to the light-modulating cell 10 illustrated in FIG. 2. Thus, the interference of diffracted light generated by the respective spacers 30 does not periodically occur, and it is possible to reduce the influence of interference of diffracted light generated by the plurality of spacers 30 and provide observation light excellent in visibility.

On the other hand, when a voltage is applied to the first transparent electrode 25 and the second transparent electrode 26 by the light-modulating controller 12 (see FIG. 1), the desired electric field is applied to the liquid crystal layer 29, and the dichroic pigment 51 and the liquid crystal 52 are aligned in the vertical direction (see FIG. 12). In this case, the light shielding performance of the dichroic pigment 51 with respect to the light passing through the liquid crystal layer 29 is hardly exerted regardless of the light vibrating direction, and the light entering the liquid crystal layer 29 passes through the liquid crystal layer 29 (the dichroic pigment 51 and the liquid crystal 52) with a high probability. In addition, since no polarizing plate is provided in this example, the entire light passing through the liquid crystal layer 29 and emitted from a first film substrate 23 is emitted from the light-modulating cell 10.

Even in the case of using the guest-host liquid crystal layer 29 illustrated in FIGS. 11 and 12 as described above, it is possible to change the light-transmitting property of the light-modulating cell 10 by controlling the voltage to be applied to the first transparent electrode 25 and the second transparent electrode 26.

Incidentally, the guest-host light-modulating cell 10 of the normally black type in which the horizontal alignment film is used as the alignment films 27 and 28 and the positive liquid crystal is used for the liquid crystal layer 29 has been described as above regarding the light-modulating cell 10 illustrated in FIGS. 11 and 12, a guest-host light-modulating cell 10 of a normally white type may be used. That is, a vertical alignment film is used as the alignment films 27 and 28, and a negative liquid crystal is used for the liquid crystal layer 29 such that the dichroic pigment 51 and the liquid crystal 52 may be aligned in the horizontal direction as illustrated in FIG. 11 when the electric field is applied to the liquid crystal layer 29 by applying the voltage between the electrodes 25 and 26. Even in the light-modulating cell 10 employing the guest-host liquid crystal of the normally white type, the above-described operational effect that it is possible to reduce the influence of diffracted light generated by the spacers 30 can be achieved by irregularly arranging the spacers 30.

<Method of Manufacturing Light-Modulating Cell 10>

A method of manufacturing the light-modulating cell 10 according to this embodiment is not particularly limited, and the light-modulating cell 10 can be manufactured using arbitrary bonding technique, photolithography technique, or the like. In particular, the columnar spacer 30 having the tapered shape can be suitably manufactured by the photolithography technique. In the case of forming each of the spacers 30 based on the photolithography technique, irradiation with light with respect to a resist (exposure step) is performed using a mask in which a pattern that is defined in accordance with the arrangement of the respective spacers 30 is formed. Incidentally, a method of forming the above-described pattern in the mask is not particularly limited, and, for example, it is possible to randomly arrange all lattice points (all the spacers 30) by shifting X-Y coordinates of the respective lattice points (arrangement points of the respective spacers 30) using an arbitrary method on the basis of a pattern of a square lattice.

Figure 13:
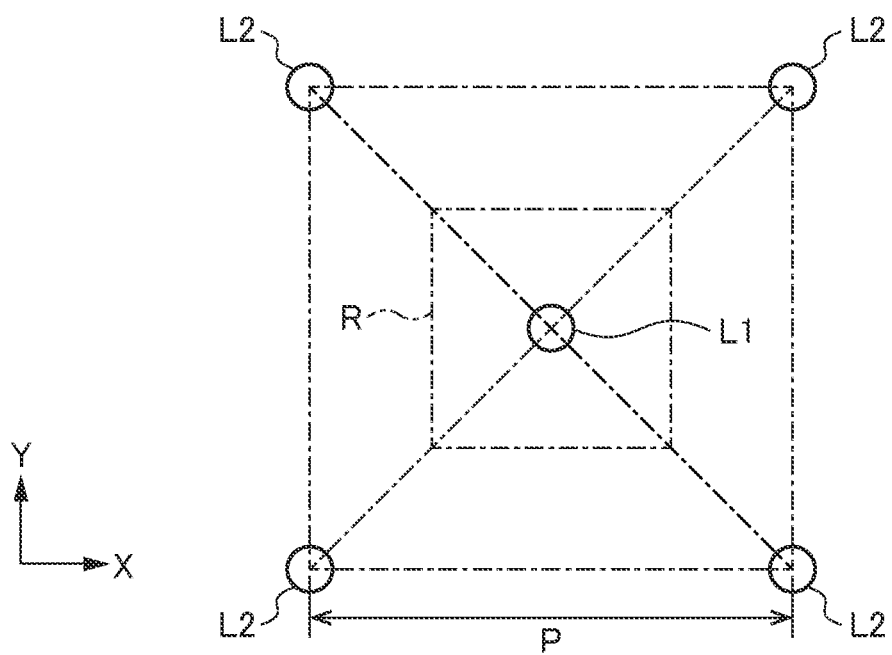
FIG. 13 is a view for describing an example of a method of determining a mask pattern.

The inventor of the present application has observed a diffraction state of light with respect to each of a plurality of kinds of "groups of the spacers 30" having different shift ranges by changing the shift range of each lattice point of the square lattice in order to determine the arrangement of the respective spacers 30. Specifically, as illustrated in FIG. 13, one side of a square formed by four lattice points (that is, "diagonal lattice points L2 (diagonal spacers 30)), arranged on diagonal lines having each lattice point (that is, a "lattice point L1 of interest (the spacer 30 of interest)") as the center in the square lattice, is set as a "diagonal pitch P". A limit R of the shift range with respect to the X-Y coordinates of the lattice point L1 of interest (the spacer 30 of interest) was restricted to a size of 10% to 50% of the diagonal pitch P, and the arrangement of the lattice points L1 of interest (the spacers 30 of interest) was randomly shifted by using random numbers. Here, the "spacer 30 of interest" does not indicate only the specific spacer 30 among all the spacers 30, but each of all the spacers 30 is treated as the "spacer 30 of interest" referred to herein. That is, the arrangement of all the spacers 30 is randomly shifted by determining arrangement of the respective spacers 30 as described above based on positions of the diagonal lattice points L2 (diagonal spacers 30) allocated to each of the spacers 30. As the arrangement of all the spacers 30 is shifted using the "method of shifting the arrangement of the spacers 30 of interest based on the positions of the diagonal lattice points L2" in this manner, it is possible to randomly arrange all the spacers 30. As a result, a good result that a diffraction phenomenon was almost inconspicuous was obtained in a "range where a length of one side of the limit R of the shift range with respect to the X-Y coordinates of the respective spacers 30 is 30% or more and 50% or less of the diagonal pitch P" although the diffraction phenomenon was somewhat conspicuous in a "range where the length of one side of the limit R of the shift range with respect to the X-Y coordinates of the respective spacers 30 is 10% or more and less than 30% of the diagonal pitch P".

For example, a process of coating the top of the second transparent electrode 26 with a photosensitive resin (photo-curable resin) forming the spacer 30, forming the tapered spacer 30 using the photosensitive resin by the photolithography technique, and then, forming the second alignment film 28 on the second transparent electrode 26, and imparting an alignment regulating force to the second alignment film 28 by rubbing or the like may be performed. In this case, the alignment imparting process is performed with respect to the second alignment film 28 in the state where the spacer 30 has been formed. Incidentally, when the alignment imparting process for the second alignment film 28 is performed in a state where the "inverted tapered spacer 30" in which the bottom portion (first bottom portion 31) of each of the spacers 30 on the first alignment film 27 side is larger than the bottom portion (second bottom portion 32) on the second alignment film 28 side is formed, it is sometimes difficult to impart the sufficient alignment with respect to the second alignment film 28 in the vicinity of the spacer 30. Therefore, the "forward tapered spacer 30" in which the bottom portion (first bottom portion 31) of each of the spacers 30 on the first alignment film 27 side is smaller than the bottom portion (second bottom portion 32) on the second alignment film 28 side is preferable from the viewpoint of imparting the alignment with respect to the second alignment film 28.

Next, a specific example will be described.

Specific Example 1 (Comparative Example)

A light-modulating cell 10 of this example is the light-modulating cell 10 that controls transmitted light using a liquid crystal. A liquid crystal layer 29 was sandwiched between films for liquid crystal orientation layers (a first alignment film 27 and a second alignment film 28) to prepare a liquid crystal cell, and the liquid crystal cell was sandwiched between linearly polarizing plates (a first polarizing plate 21 and a second polarizing plate 22) arranged in a parallel nicol state, thereby producing the light-modulating cell 10 of this example. Specifically, the light-modulating cell 10 of this example has the same layer structure as the light-modulating cell 10 illustrated in FIG. 2 (that is, the first polarizing plate 21, the second polarizing plate 22, a first film substrate 23, a second film substrate 24, a first transparent electrode 25, a second transparent electrode 26, the first alignment film 27, the second alignment film 28, the liquid crystal layer 29, and spacers 30 (particularly, spacers 30a)).

A TN liquid crystal is used for the liquid crystal layer 29 in this example, and a polarization plane of passing light is rotated by 90° in a state where no electric field is applied. The spacer 30, configured to hold a constant thickness of the liquid crystal layer 29 (liquid crystal material), is provided between the films for liquid crystal orientation layers (particularly, the first alignment film 27 and the second alignment film 28 (strictly speaking, the second transparent electrode 26)). The spacer 30 of this example is made of a transparent material and does not have a light shielding property with respect to visible light. Each of the spacers 30 was arranged so as to have a constant distance to the other spacer 30 positioned at the closest distance. In addition, a film-shaped resin substrate (particularly, a film substrate made of polycarbonate in this example) was used as the first film substrate 23 supporting the first transparent electrode 25 and the second film substrate 24 supporting the second transparent electrode 26. The films for liquid crystal orientation layers were formed by sequentially producing electrodes (the first transparent electrode 25 and the second transparent electrode 26) and alignment layers (the first alignment film 27 and the second alignment film 28) with respect to the film member (substrate).

When light (light from a point light source) having passed through the light-modulating cell 10 of this example was visually confirmed, the light from the point light source was affected by interference of diffracted light generated by the respective spacers 30, and a light interference region was generated around the point light source.

Specific Example 2 (Example)

Each of spacers 30 (all spacers 30) used in a light-modulating cell 10 of this example was arranged so as to have an inconstant distance to the other spacer 30 positioned at the closest distance. The other configurations of the light-modulating cell 10 of this example are the same as those of the above-described Specific Example 1 (comparative example).

When light (light from a point light source) having passed through the light-modulating cell 10 of this example was visually confirmed, the influence (light intensity) of interference of diffracted light generated by the respective spacers 30 on the light from the point light source was reduced to extent that is hardly visually recognized by randomly arranging the spacers 30, and no light interference region was generated around the point light source.

As described above, it is possible to reduce the influence of interference of diffracted light generated by the plurality of spacers 30 and to provide the observation light excellent in visibility by setting at least some of the plurality of spacers 30 to have an inconstant distance to the other spacer 30 positioned at the closest distance.

Embodiments of the present invention are not limited to the individual embodiments described above, but include various modifications that can be conceived by those skilled in the art, and the effects of the present invention are not limited to the above-described content. That is, various additions, modifications, and partial deletions can be made in a scope not departing from the conceptual idea and gist of the present invention derived from the content defined in the claims and their equivalents.

REFERENCE SIGNS LIST

5 Light-modulating system
10 Light-modulating cell
12 Light-modulating controller
14 Sensor device
16 User operation unit
21 First polarizing plate
22 Second polarizing plate
23 First film substrate
24 Second film substrate
25 First transparent electrode
26 Second transparent electrode
27 First alignment film
28 Second alignment film
29 Liquid crystal layer
30 Spacer
31 First bottom portion
32 Second bottom portion
34 Unit pattern
35 Unstable area
40 Core portion
41 Covering portion
42 First support surface
43 Second support surface
50 Unit pattern area
51 dichroic pigment
52 Liquid crystal

The invention claimed is:

1. A light-modulating cell comprising:
a pair of film substrates;
a pair of electrodes arranged between the pair of film substrates;
a pair of alignment films arranged between the pair of electrodes;
a plurality of spacers supporting at least any one of the pair of alignment films and being in two-dimensional contact with at least any one of the pair of alignment films; and
a liquid crystal layer arranged between the plurality of spacers between the pair of alignment films,
wherein the liquid crystal layer contains at least a dichroic pigment,
at least some of the plurality of spacers have an inconstant distance to another spacer positioned at a closest distance,
at least any one of the pair of film substrates is partially or entirely curved,
no polarizing plate is provided, and
alignment of the dichroic pigment is twisted by 180 degrees or more with respect to a horizontal direction in a state where no electric field is applied.

2. The light-modulating cell according to claim 1, wherein each of the plurality of spacers includes: a first bottom portion which has a flat shape and is in contact with one of the pair of alignment films; and a second bottom portion opposing the first bottom portion.

3. The light-modulating cell according to claim 1, wherein the plurality of spacers are made of a photocurable resin.

4. The light-modulating cell according to claim 1, wherein the plurality of spacers are configured by repeatedly arranging unit patterns each of which is formed of three or more spacers arranged with a predetermined relative positional relationship.

5. The light-modulating cell according to claim 1, wherein each of the plurality of spacers has a tapered shape that tapers from one of the pair of alignment films toward the other alignment film.

6. The light-modulating cell according to claim 1, wherein a taper angle of each of the plurality of spacers is in a range of 75° or larger and 85° or smaller.

7. The light-modulating cell according to claim 1, wherein each of the plurality of spacers includes a core portion and a covering portion covering at least a part of the core portion, each of the plurality of spacers penetrates through one of the pair of alignment films and the liquid crystal layer, and each of the plurality of spacers includes: a first support surface being in two-dimensional contact with the other alignment film of the pair of alignment films; and a second support surface being in two-dimensional contact with one of the pair of electrodes, and the first support surface is formed by the covering portion, and at least a part of the second support surface is formed by the core portion.

* * * * *